United States Patent Office 3,393,757
Patented July 23, 1968

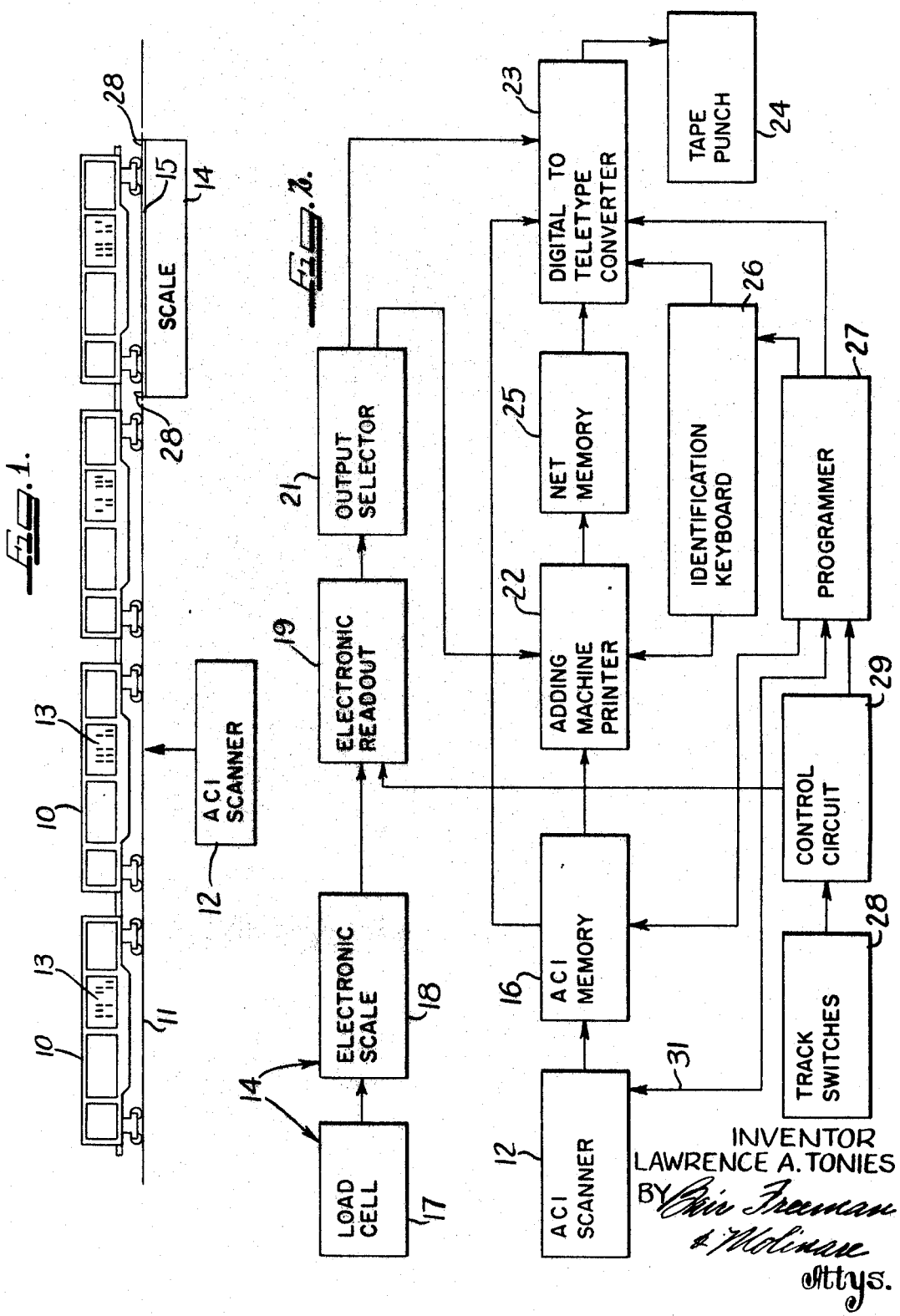

3,393,757
WEIGHING AND IDENTIFICATION SYSTEM
Lawrence A. Tonies, Grayslake, Ill., assignor to Mangood Corporation, Chicago, Ill., a corporation of Illinois
Filed Oct. 1, 1965, Ser. No. 492,246
6 Claims. (Cl. 177—3)

This invention relates to a weighing and identification system and more particularly to a system for automatically weighing moving railroad cars and the like, either coupled or uncoupled and recording the weight and other identifying data relating to such cars.

In weighing railroad cars in motion, either coupled or uncoupled, it has heretofore been the practice to weigh the gross weight of the individual cars and subsequently to obtain the net weight by subtracting the tare weight from the gross in a separate operation. It has also been necessary to identify the cars manually either by separate markings on the records or by observing the sequence of cars in a string being weighed.

The present invention relates to a weighing and identification system which the tare weight and the identification of the cars is automatically observed at a scanning station and the cars are subsequently weighed at a weighing station with the observed data and the gross weight being automatically recorded to provide an indication not only of the net weight of the car contents but also identifying data relating to the car.

An object of the invention is to provide a system in which data obtained by scanning indicia on the cars as they pass a scanning station is memorized and coordinated with car weight data subsequently obtained in a complete automatic system.

According to a feature of the invention, the system may accept and record additional manually supplied data relating to the cars.

The above and other objects and features of the invention will be more readily apparent from the following description when read in connection with the accompanying drawings in which:

FIGURE 1 is a diagrammatic view of a system installation according to the invention; and FIGURE 2 is a block diagram of the system.

FIGURE 1 indicates generally a system embodying the present invention applied to the weighing and recording of identifying information on a string of railroad cars which are weighed coupled and in motion. As shown, a string of cars 10 which may be identical cars or cars of different types travel along a track 11 from left to right. A scanner 12 is mounted adjacent to the track at a scanning station to scan the cars as they travel and pass and to obtain information such as tare weight, car identification numbers and the like from each car. For this purpose, each car is provided with coded markings indicated at 13 indicative of the tare weight of the car and the car identification. These markings may be in the form of magnetic areas which are magnetically scanned by the scanner or in the form of light reflective or absorbent areas which are optically scanned by the scanner. In either case, the scanner will receive a series of coded pulses indicative of the tare weight of the car and of the car identification and this information will be stored or memorized for subsequent transmission to a recorder, as explained more fully hereinafter.

Downstream from the scanning station, the cars pass over a scale indicated at 14 on which they are weighed as they travel. The scale may constitute a single elongated weigh rail, as shown at 15, for simultaneous weighing both trucks of a car or could be a shorter scale for weighing the trucks individually and adding the weights thereof in a manner well known in the art. In any event, the scale will produce an output constituting a coded digital indication of the car gross weight which is recorded along with the data obtained by the scanner.

The complete system is illustrated in block diagram in FIGURE 2, it being understood that the individual components are types of devices which are known in the art and which may take any one of a variety of specific forms. As shown, the scanner 12 feeds the coded information obtained thereby to a memory unit 16 in which the information is stored in digital form. The memory unit could comprise a series of stepping switches actuated by signals from the scanner to set up the digital information which is to be stored or could be a series of flip-flop circuits which are energized in a known manner to store the information. Any type of machanical or electrical memorizing unit which will receive the information in digital pulse form and retain it may be employed.

The scale 14, as illustrated digrammatically, may comprise two units, the first unit 17 may be electric load cells which will produce a voltage output proportional to the weight on the scale beam. This output is fed into an electronic scale unit 18 which converts the load cell voltage to electrical coded pulses representative of the weight of the car. The output of the electronic scale is supplied to a readout device 19 in which the indicated weight is converted to digital form and which may be relay circuits to produce coded digital information acceptable to the recording and calculating mechanism employed.

This information is fed to an output selector 21 which is in effect a conventional splitter circuit to convert the single output of the device 19 into two separate outputs.

One of these outputs is added to an adding machine printer which may be a conventional type of unit available on the market for receiving digital coded information and for adding or subtracting information received by it. The other output is supplied to a digital Teletype converter 23 which again is a conventional unit available on the open market for converting digital coded signals received by it into signals capable of operating a tape punch unit 24 or similar recording unit.

The memory unit 16 also provides two outputs, one of which is fed into the adding machine printer 22 and the other of which is fed into a digital to Teletype converter 23. The adding machine printer will subtract the tare weight indication received by it, from the memory unit 16, from the gross weight indication received by it, from the selector 21 to provide an indication of the net car weight. This information is fed into a net memory unit 25 which in turn feeds the net weight information into the digital to Teletype converter 23. In addition to the information received from the memory unit 16 and the output selector 21, additional manually supplied information may be fed into an adding machine printer and the converter 23 from a manually operated keyboard 26. This unit may be manually operated as the cars travel along the track to feed in any desired type of additional information such as the character of the lading to the printer and the Teletype converted.

Coordination of the operation of the several system elements is controlled by a programmer 27 which is in turn controlled by movement of the cars over the scale so that all of the data will be correctly coordinated and recorded. For this purpose, the scale is provided with one or more track switches shown at 28 adjacent to its ends and which will sense when a car or car truck is in a position to be weighed. These track switches 28, as indicated in the diagram, FIGURE 2, control a control circuit 29 which produces an output signal when the car or car truck is scale borne and is in condition to be weighed. The signal from the control circuit 29 is supplied to the readout device 19 so that it will be tripped and actuated when the car is in condition to be weighed to produce an indication of the car weight. The control circuit signal is also fed into a programmer. The programmer is connected to the scanner by a line 31, as indicated so that when the scanner has scanned a car and fed the information related thereto into the memory unit 16, a signal will be supplied to the programmer to condition it for operation upon receipt of a signal from the control circuit 29. When the programmer receives a signal from the control circuit 29, it supplies a signal to the memory unit 16 tripping it so that the information relating to the car which is then scale borne will be supplied from the memory unit to the adding machine printer 22 and also to the digital to Teletype converter 23. Simultaneously, a signal from the programmer will be supplied to the identification keyboard 26 so that any information stored therein will be fed to the adding machine printer and the digital to Teletype converter. At the same time, the programmer will supply a signal to the digital to Teletype converter causing it to operate to record through the tape punch device or other selected type of recorder all of the various information which it has received from the memory unit 16, the output selector 21, the net memory unit 25 and the identification keyboard 26. In this way, proper recording of all of the desired information concerning a particular car is simultaneously recorded through the digital to Teletype converter in a form in which it can readily be retrieved later for any desired uses. The adding machine printer may also produce a printed record indicative of the gross tare and net weights of a car together with any additional identifying information received from the scanner and the identification keyboard.

While one embodiment of the invention has been shown and described in detail, it will be understood that it is illustrative only and is not to be taken as a definition of the scope of the invention, reference being had for this purpose to the appended claims.

What is claimed is:

1. A weighing and identification system for a series of moving cars each of which is provided with coded markings indicative of the car tare weight comprising a scanner positioned adjacent to the path of movement of the cars to produce coded pulses corresponding to said coded markings as a car moves past the scanner, a memory unit receiving the coded pulses from the scanner, a weighing station in the path of movement of the cars downstream from the scanner, means responsive to the gross weight of a car at the weighing station to produce a coded digital indication of the car gross weight, an adding device connected to the memory unit and the weight responsive means to subtract the weight from the gross weight, means operable when a car is at the weighing station to produce a control signal, and means to supply the control signal to the memeory unit to cause the coded pulses stored therein to be transmitted to the adding device.

2. The system of claim 1 including a manually operable unit to produce coded pulses identifying a car connected to the adding device to supply such pulses thereto.

3. The system of claim 1 including recording mechanism connected to the memory unit, the adding device, the weight responsive means and the control signal producing means and operable in response to a control signal to record the gross, tare and net weights of a car.

4. A weighing and identification system for a series of moving cars each of which is provided with coded markings indicative of the car tare weight comprising a scanner positioned adjacent to the path of movement of the cars to produce coded pulses corresponding to said coded markings as a car moves past the scanner, a memory unit receiving the coded pulses from the scanner, a weighing station in the path of movement of the cars downstream from the scanner, means responsive to the gross weight of a car at the weighing station to produce a coded digital indication of the car gross weight, recording mechanism connected to the memory unit and the weight responsive means to receive coded information therefrom, means operable when a car is at the weighing station to produce a control signal, and means to supply the control signal to the memory unit cause the coded information stored therein to be transmitted to the recording mechanism.

5. The system of claim 4 including a manually operable unit to produce coded car identification signals connected to the recording mechanism and connected to the last named means to supply such signals to the recording mechanism in response to the control signal.

6. The system of claim 1 in which each car is provided with coded markings indicative of the car identification and the scanner scans such markings to produce corresponding coded pulses.

References Cited

UNITED STATES PATENTS

| 2,981,830 | 4/1961 | Davis | 246—122 X |
| 3,106,706 | 10/1963 | Kolanowski | 250—223 X |
| 3,192,535 | 6/1965 | Watson | 177—1 |

FOREIGN PATENTS

| 765,299 | 8/1967 | Canada. |

RICHARD B. WILKINSON, *Primary Examiner.*

LAURENCE HAMBLEN, *Assistant Examiner.*

UNITED STATES PATENT OFFICE
CERTIFICATE OF CORRECTION

Patent No. 3,393,757  July 23, 1968

Lawrence A. Tonies

It is certified that error appears in the above identified patent and that said Letters Patent are hereby corrected as shown below:

Column 1, line 23, after "system" insert -- by --. Column 2, line 16, "machanical" should read -- mechanical --. Column 3, line 4, after "indicated" insert a comma; line 51, after "subtract the" insert -- tare --.

Signed and sealed this 9th day of December 1969.

(SEAL)
Attest:

Edward M. Fletcher, Jr.
Attesting Officer

WILLIAM E. SCHUYLER, JR.
Commissioner of Patents